United States Patent
Chang et al.

(10) Patent No.: US 7,792,655 B2
(45) Date of Patent: Sep. 7, 2010

(54) SYSTEM AND METHOD FOR SCANNING AND OBTAINING POINTS OF AN OBJECT

(75) Inventors: Chih-Kuang Chang, Taipei Hsien (TW); Yi-Rong Hong, Shenzhen (CN); Li Jiang, Shenzhen (CN); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 124 days.

(21) Appl. No.: 12/169,637

(22) Filed: Jul. 9, 2008

(65) Prior Publication Data
US 2009/0043535 A1      Feb. 12, 2009

(30) Foreign Application Priority Data
Aug. 9, 2007      (CN) ........................ 2007 1 0201309

(51) Int. Cl.
*G06F 15/00*      (2006.01)

(52) U.S. Cl. .................. 702/97; 702/150; 702/152; 702/159; 356/601; 356/607; 356/608; 356/614

(58) Field of Classification Search ......... 702/150–153, 702/159, 97; 356/601, 607–608, 614
See application file for complete search history.

(56) References Cited

U.S. PATENT DOCUMENTS 6,549,639 B1 *     4/2003   Genest ....................... 382/100

* cited by examiner

*Primary Examiner*—Drew A Dunn
*Assistant Examiner*—Hien X Vo
(74) *Attorney, Agent, or Firm*—Frank R. Niranjan

(57) ABSTRACT

A computer-implemented method for scanning and obtaining points of an object is provided. The method includes defining a measuring distance between two points of an object and scanning the measuring distance according to an optimal measuring position. If coordinate values of each of the scanned points are valid, then the method send the obtained coordinate values to an electronic device if the obtained coordinate values are valid.

6 Claims, 3 Drawing Sheets

SYSTEM AND METHOD FOR SCANNING AND OBTAINING POINTS OF AN OBJECT

BACKGROUND OF THE INVENTION

1. Field of the Invention

Embodiments of the present disclosure relate to a system and method for scanning and obtaining points of an object.

2. Description of Related Art

Nowadays, the method of image measuring is widely used in precision measurement field. Measuring objects by using the method of image measuring is very accurate and fast. Conventionally, when measuring the objects using the method of image measuring, a charged coupled device (CCD) is used for capturing the images of the objects. The images captured by the CCD are then transmitted to a computer, and an image measuring program installed in the computer measures the images automatically.

However, if users want to measure points of smaller objects, such as a land grid array (LGA), or a ball grid array (BGA), the charged coupled device may not be of sufficient accuracy to capture details of the objects, thus causing inefficiency.

Therefore, what is needed is a system and method for measuring an object with a greater accuracy.

SUMMARY

In one aspect, a system for scanning and obtaining points of an object is provided. The system includes a selecting module, a focusing module, a scanning module, an obtaining module, a determining module and a sending module. The selecting module is configured for selecting a measuring start point and a measuring end point of the object, wherein a distance between the measuring start point and the measuring end point define a measuring distance. The focusing module is configured for focusing on the measuring distance to obtain an optimal measuring position. The scanning module is configured for scanning the measuring distance according to the optimal measuring position, wherein the scanning comprises a plurality of scanned points. The obtaining module is configured for obtaining coordinate values for each of the plurality of scanned points. The determining module is configured for determining if the obtained coordinate values are valid coordinate values. The sending module is configured for sending the obtained coordinate values to an electronic device if the obtained coordinate values are valid coordinate values.

Other advantages and novel features of the present invention will become more apparent from the following detailed description of preferred embodiment when taken in conjunction with the accompanying drawings.

DETAILED DESCRIPTION OF CERTAIN INVENTIVE EMBODIMENTS

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer.

As used herein, the term, "object" is defined to include three-dimensional items of varying sizes. As non-limiting examples, objects may include a watch, a storage device, a capacitor, and circuit board connectors, such as LGAs and BGAs, for example.

Figure 1:
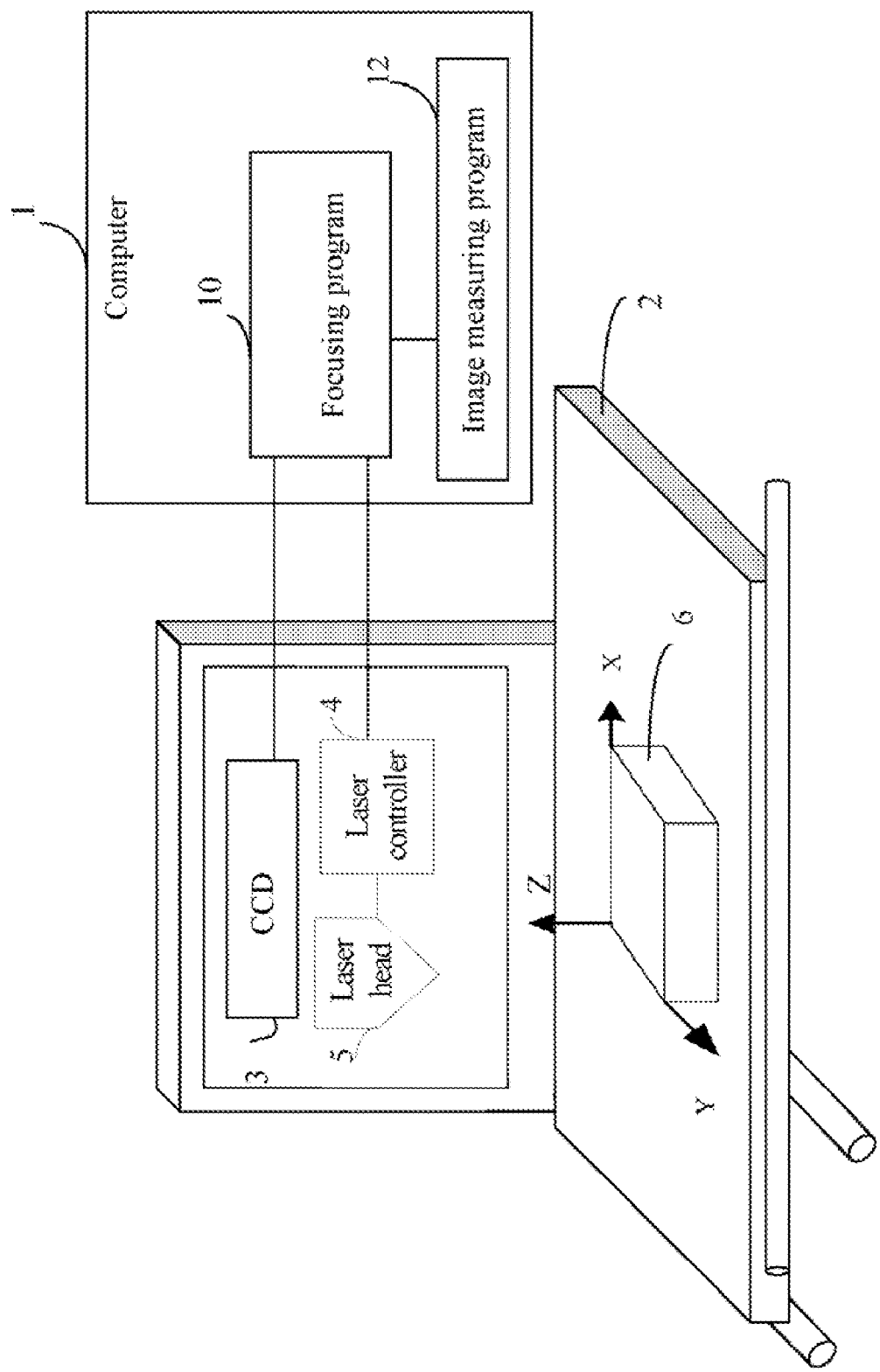
FIG. 1 is a schematic diagram of one embodiment of a system for scanning and obtaining points of an object.

FIG. 1 is a schematic diagram of one embodiment of a system 20 for scanning and obtaining coordinate points of an object 6. The system 20 typically includes a computer 1 and a measuring machine 2 on which the object 6 is placed thereon. In operation, an object to be measured, such as the object 6, is placed on a surface of the measuring machine 2 where coordinate points of the object 6 are computed by the computer 1. Using the coordinate points, the computer 1 can compute various size and angle measurements of the object 6.

In one embodiment, the measuring machine 2 comprises a charged coupled device 3 (CCD), a laser head 5, and a laser controller 4. In the embodiment of FIG. 1, the CCD 3, the laser head 5, and the laser controller 4 may be positioned on a Z-axis of the measuring machine so as to measure coordinate values of the object 6. However, it may be understood, that in other embodiments, the CCD 3, the laser head 5, and the laser controller 4 may be each or collectively positioned in an X-axis, a Y-axis, or the Z-axis of the measuring machine 2.

The CCD 3 is used for focusing on a plurality of coordinate points of the object 6 to obtain an optimal measuring position. The laser head 5 is used for scanning a plurality of coordinate points of the object 6 according to the optimal measuring position. The laser controller 4 is used for obtaining the coordinate values of each of the scanned points from the laser head 5.

The computer 1 receives coordinate values from the laser controller 4 and computes coordinate points of the object 6 in order to measure the object 6. In one embodiment, the computer 1 may include a focusing program 10 and an image measuring program 12. The computer 1 is connected with the CCD 3, for example, through a cable, and is configured for focusing and obtaining coordinate values of each of the scanned points of the object 6. The image measuring program 12 is configured for sending a focusing command to the focusing program 10, receiving obtained coordinate values from the focusing program 10, and calculating a result of received coordinate values.

Figure 2:
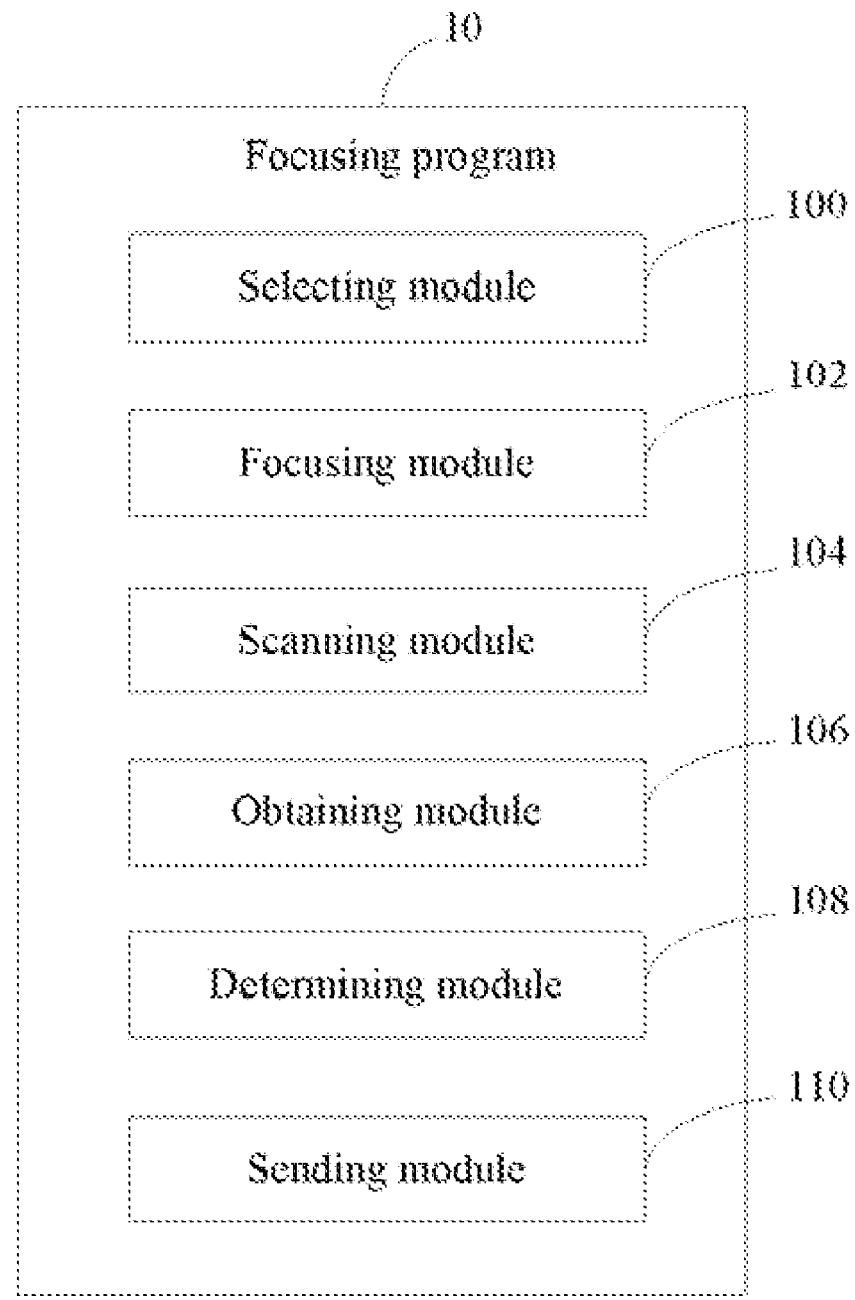
FIG. 2 is a block diagram of one embodiment of a focusing system of FIG. 1 comprising software function modules.

FIG. 2 is a block diagram of one embodiment of the focusing program of FIG. 1 comprising software function modules. The software function modules may be used to implement certain functions and will be described in greater detail below. In one embodiment, the focusing program 10 mainly includes: a selecting module 100, a focusing module 102, a scanning module 104, an obtaining module 106, a determining module 108 and a sending module 110.

The selecting module 100 is configured for selecting a measuring start point and a measuring end point of the object 6. The measuring start point and the measuring end point may be used to obtain a measuring distance. The measuring distance may be used for controlling the laser head 5 to scan the object 6 from the measuring start point to the measuring end point within the measuring distance.

The focusing module 102 is configured for controlling the CCD 3 to focus on the measuring distance between the measuring starting point and the measuring end point of the object 6 to obtain an optimal measuring position according to a focusing command from the image measuring program 12. In one embodiment, the optimal measuring position is located on the Z-axis coordinate of the measuring machine 2, and is used by the CCD 3 to capture a high-quality image of the measuring distance.

The scanning module 104 is configured for controlling the laser head 5 to scan the measuring distance according to the optimal measuring position.

The obtaining module 106 is configured for controlling the laser controller 4 to obtain coordinate values of each of the scanned points from the laser head 5. Each of the coordinate values typically includes a prefix parameter, an X-axis coordinate value, a Y-axis coordinate value, and a Z-axis coordinate value. The prefix parameter is a parameter of the laser head 5. It may be understood that different laser heads may have different parameters. It may be understood that the prefix parameter is a character string, such as, ME, HQ, and SK, for example. In one example, if the prefix parameter is ME, then an X-axis coordinate value may be 10, a Y-axis coordinate value may be 20, and a Z-axis coordinate value may be 30, for example. Accordingly, the coordinate value may be (ME, 10, 20, 30) in one embodiment.

The determining module 108 is configured for determining whether the obtained coordinate values are valid coordinate values. If the prefix parameters of each of the obtained coordinate values are the same as the parameter of the laser head 5, then the determining module 108 determines that the obtained coordinate values are valid coordinate values. If the prefix parameters of each of the obtained coordinate values are not the same as the parameter of the laser head 5, then the determining module 108 determines that the obtained coordinate values are invalid coordinate values. Accordingly, the focusing program 10 may determine new coordinate values for the object using the obtaining module 106.

The sending module 110 is configured for sending the obtained coordinate values to the image measuring program 12 if the obtained coordinate values are valid.

Figure 3:
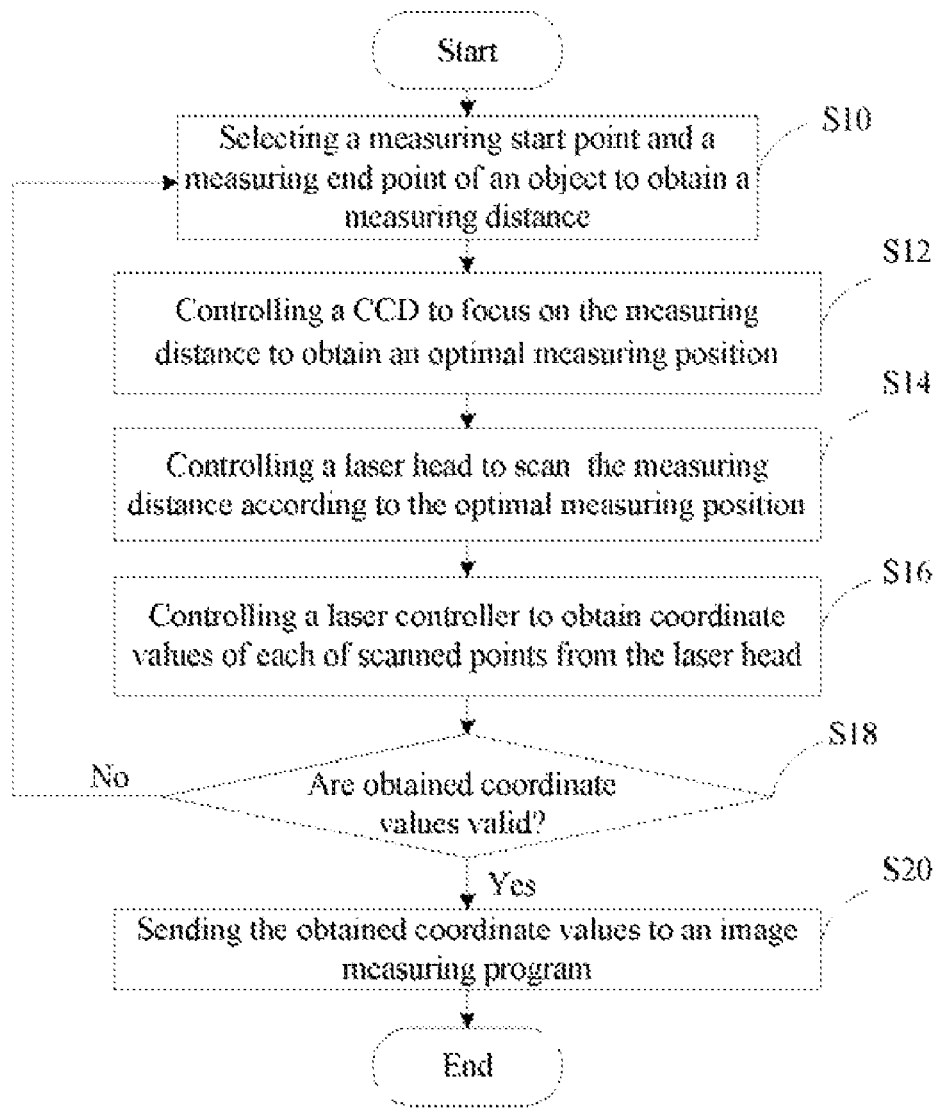
FIG. 3 is a flowchart illustrating one embodiment of a method for scanning and obtaining points of an object.

FIG. 3 is a flowchart illustrating one embodiment of a method for scanning and obtaining points of the object 6. Depending on the embodiment, additional blocks may be added, others removed, and the ordering of the blocks may be changed.

In block S10, the selecting module 100 selects a measuring start point and a measuring end point of the object 6 to obtain a measuring distance.

In block S12, the focusing module 102 controls the CCD 3 to focus on the measuring distance between the measuring starting point and the measuring end point of the object 6 to obtain an optimal measuring position according to a focusing command from the image measuring program 12. As mentioned above, the optimal measuring position, in one embodiment, is located on the Z-axis coordinate of the measuring machine 2, and is used for the CCD 3 to capture a high-quality image of the measuring distance.

In block S14, the scanning module 104 controls the laser head 5 to scan the measuring distance according to the optimal measuring position.

In block S16, the obtaining module 106 controls the laser controller 4 to obtain coordinate values for each of scanned points from the laser head 5.

In block S18, the determining module 108 determines whether obtained coordinate values are valid coordinate values. If the prefix parameters of each of the coordinate values are the same as parameter of the laser head 5, then the determining module 108 determines the obtained coordinate values are valid coordinate values. Otherwise, if the prefix parameters of each of the coordinate values are not the same as parameter of the laser head 5, then the determining module 108 determines the obtained coordinate values are not valid coordinate values.

If the determining module 108 determines the obtained coordinate values are valid coordinate values, then in block S20, the sending module 110 sends the obtained coordinate values to the image measuring program 12. Otherwise, if the obtained coordinate values are not valid coordinate values, then the procedure returns to block S10 as described above.

The image measuring program 12 may receive the valid coordinate values and may calculate a result of the valid coordinate values. Accordingly, the image measuring program 12 may calculate various dimensional values of the object 6 using one or more formulas.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for scanning and obtaining points of an object, the system comprising:
   a selecting module configured for selecting a measuring start point and a measuring end point of the object, wherein a distance between the measuring start point and the measuring end point define a measuring distance;
   a focusing module configured for focusing on the measuring distance to obtain an optimal measuring position;
   a scanning module configured for scanning the measuring distance according to the optimal measuring position, wherein the scanning comprises a plurality of scanned points;
   an obtaining module configured for obtaining coordinate values for each of the plurality of scanned points, wherein each of the coordinate values comprises a prefix parameter, an X-axis coordinate value, a Y-axis coordinate value, and a Z-axis coordinate value;
   a determining module configured for determining the obtained coordinate values are valid coordinate values upon the condition that the prefix parameters of each of the coordinate values are the same as parameter of the laser head, or determining the obtained coordinate values are not valid coordinate values upon the condition that the prefix parameters of each of the coordinate values are not the same as parameter of the laser head; and
   a sending module configured for sending the obtained coordinate values to an electronic device if the obtained coordinate values are valid coordinate values.

2. The system as claimed in claim 1, wherein the obtaining module is further configured for displaying coordinates values of each of the plurality of scanned points.

3. A computer-implemented method for scanning and obtaining points of an object, the method comprising:
   (a) selecting a start point and an end point of the object, wherein a distance between the start point and the end point defines a measuring distance;
   (b) focusing on the measuring distance to obtain an optimal measuring position;
   (c) scanning the measuring distance according to the optimal measuring position;
   (d) obtaining coordinate values for each of scanned points, wherein each of the coordinate values comprises a prefix parameter, an X-axis coordinate value, a Y-axis coordinate value, and a Z-axis coordinate value;

(e) determining the obtained coordinate values are valid coordinate values upon the condition that the prefix parameters of each of the coordinate values are the same as parameter of the laser head, or determining the obtained coordinate values are not valid coordinate values upon the condition that the prefix parameters of each of the coordinate values are not the same as parameter of the laser head; and (f) sending the obtained coordinate values to an electronic device if the obtained coordinate values are valid coordinate values.

4. The method as claimed in claim 3, wherein the optimal measuring position is used by the CCD to capture a high-quality image of the measuring distance.

5. The method as claimed in claim 3, wherein the scan comprises a plurality of scanned points.

6. A system for measuring coordinate values of a three-dimensional object, the system comprising:

a charge coupled device that focuses on a first coordinate point and a second coordinate point of the object so as to obtain an optimal measuring position;

a laser head that scans from the first coordinate point to a second coordinate point of the object according to the optimal measuring position so as to obtain coordinate values of a distance between the first coordinate point and the second coordinate point, wherein each of the coordinate values comprises a prefix parameter, an X-axis coordinate value, a Y-axis coordinate value, and a Z-axis coordinate value, determines the obtained coordinate values are valid coordinate values upon the condition that the prefix parameters of each of the coordinate values are the same as parameter of the laser head, or determines the obtained coordinate values are not valid coordinate values upon the condition that the prefix parameters of each of the coordinate values are not the same as parameter of the laser head; and a laser controller that obtains the coordinate values of the distance between the first coordinate point and the second coordinate point so as to provide coordinate values to a computer to calculate a measurement of the object.

* * * * *